US007554908B2

(12) United States Patent
Jain et al.

(10) Patent No.: US 7,554,908 B2
(45) Date of Patent: Jun. 30, 2009

(54) TECHNIQUES TO MANAGE FLOW CONTROL

(75) Inventors: Sanjeev Jain, Shrewsbury, MA (US); Mark B. Rosenbluth, Uxbridge, MA (US); Gilbert Wolrich, Framingham, MA (US); Hugh M. Wilkinson, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 860 days.

(21) Appl. No.: 11/009,861

(22) Filed: Dec. 10, 2004

(65) Prior Publication Data

US 2006/0126512 A1 Jun. 15, 2006

(51) Int. Cl.
*G06F 11/00* (2006.01)
*H04J 3/14* (2006.01)
*H04L 12/26* (2006.01)

(52) U.S. Cl. ....................... 370/230; 370/236; 370/249; 709/232

(58) Field of Classification Search ...... 370/229–236.1, 370/413, 468, 396; 709/232–250; 710/316, 710/317
See application file for complete search history.

(56) References Cited

U.S. PATENT DOCUMENTS

| | | | | |
|---|---|---|---|---|
| 6,029,202 | A * | 2/2000 | Frazier et al. | 709/232 |
| 6,631,374 | B1 * | 10/2003 | Klein et al. | 707/8 |
| 2003/0016686 | A1 | 1/2003 | Wynne et al. | |
| 2003/0021230 | A1 | 1/2003 | Kuo et al. | |
| 2003/0058880 | A1 * | 3/2003 | Sarkinen et al. | 370/413 |
| 2004/0004961 | A1 | 1/2004 | Lakshmanamurthy et al. | |

OTHER PUBLICATIONS

PCT International Search Report, International Application No. PCT/US2005/044750, Date of Completion: Mar. 13, 2006, Date of Mailing: Mar. 20, 2006, pp. 1-4.

* cited by examiner

*Primary Examiner*—Afsar M. Qureshi
(74) *Attorney, Agent, or Firm*—Kacvinsky LLC

(57) ABSTRACT

Method and apparatus to manage flow control for a network device are described.

28 Claims, 7 Drawing Sheets

TECHNIQUES TO MANAGE FLOW CONTROL

BACKGROUND

A network device such as a router or switch may need to periodically perform flow control to regulate the rate at which information is communicated through the device. Techniques have been developed to send flow control messages to the various elements of the device in an attempt to perform such flow control. An example of such an element may include a transmission queue. In some devices, however, there may be a significant amount of delay between when a flow control request is issued and when it is serviced at a given transmission queue. This delay may potentially increase the complexity and cost of a network device, as well as decrease overall performance.

DETAILED DESCRIPTION

Some embodiments may be directed to improving flow control in a network device, such as a switch or router, for example. More particularly, some embodiments may use various flow control messages and a dedicated control path to decrease the amount of delay between when a flow control request is issued, and when the flow control request is serviced. Additional techniques may include the use of various state machines to accelerate the processing of the flow control messages, as well as enhancing buffer and block management of queues within a transmit buffer affected by the flow control messages. The embodiments are not limited in this context.

Figure 1:
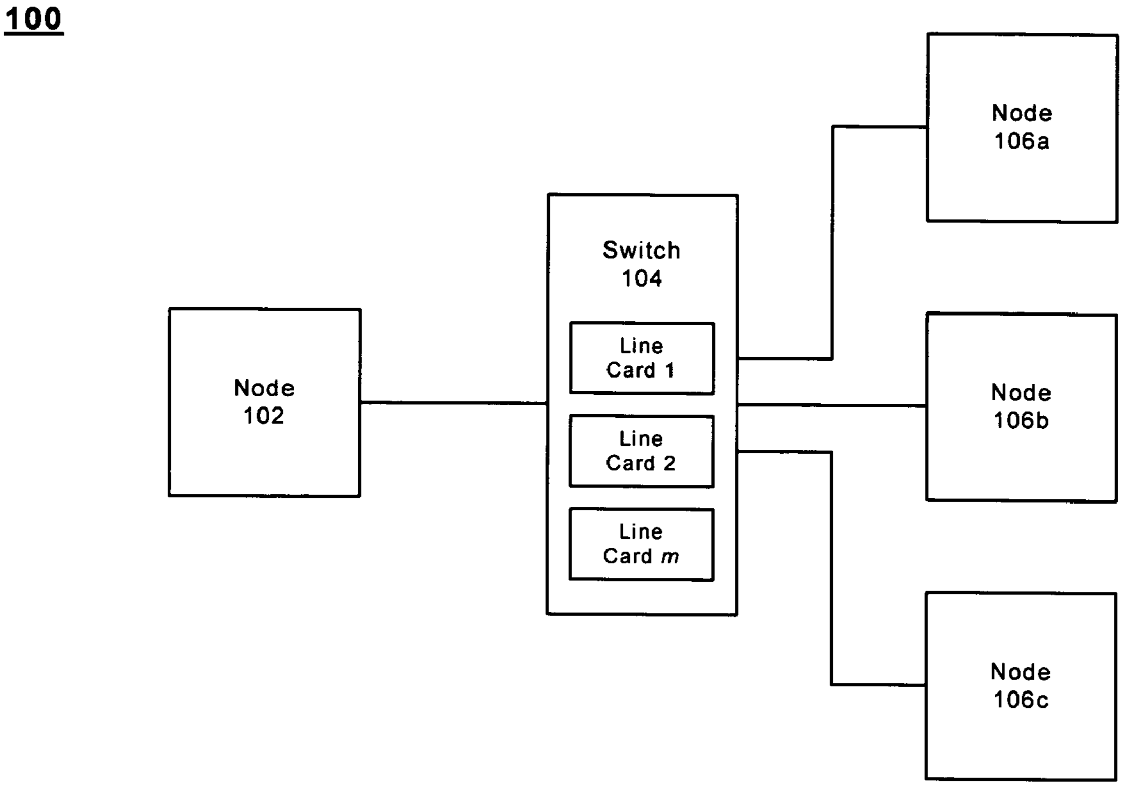
FIG. 1 illustrates a block diagram of a system 100.

FIG. 1 illustrates a block diagram of a system 100. System 100 may comprise, for example, a communication system having multiple nodes. A node may comprise any physical or logical entity having a unique address in system 100. Examples of a node may include, but are not necessarily limited to, a computer, server, workstation, laptop, ultra-laptop, handheld computer, telephone, cellular telephone, personal digital assistant, router, switch, bridge, hub, gateway, wireless access point, and so forth. The unique address may comprise, for example, a network address such as an Internet Protocol (IP) address, a device address such as a Media Access Control (MAC) address, and so forth. The embodiments are not limited in this context.

The nodes of system 100 may be arranged to communicate different types of information, such as media information and control information. Media information may refer to any data representing content meant for a user, such as voice information, video information, audio information, text information, alphanumeric symbols, graphics, images, and so forth. Control information may refer to any data representing commands, instructions or control words meant for an automated system. For example, control information may be used to route media information through a system, or instruct a node to process the media information in a predetermined manner.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may comprise a packet network communicating information in accordance with one or more packet protocols, such as one or more Internet protocols. In another example, system 100 may communicate packets using a medium access control protocol such as Carrier-Sense Multiple Access with Collision Detection (CSMA/CD), as defined by one or more IEEE 802 Ethernet standards. In yet another example, system 100 may communicate packets in accordance with one or more Asynchronous Transfer Mode (ATM) protocols. The embodiments are not limited in this context.

System 100 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), a line card, a disc controller, video controller, audio controller, and so forth. The embodiments are not limited in this context.

When implemented as a wireless system, system 100 may include one or more wireless nodes arranged to communicate information over one or more types of wireless communication media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transmitters/receivers ("transceivers"), amplifiers, filters, control logic, and so forth. Examples for the antenna may include an internal antenna, an omni-directional antenna, a monopole antenna, a dipole antenna, an end fed antenna, a circularly polarized antenna, a micro-strip antenna, a diversity antenna, a dual antenna, an antenna array, and so forth. The embodiments are not limited in this context.

Referring again to FIG. 1, system 100 may comprise nodes 102 and 106*a-c*. In addition, system 100 may include a switch or router 104 (collectively referred to herein as "switch 104"). Although FIG. 1 is shown with a limited number of elements in a certain topology, it may be appreciated that system 100 may include more or less elements in any type of topology as desired for a given implementation. The embodiments are not limited in this context.

In one embodiment, nodes 102 and 106*a-c* may each comprise a network device arranged to communicate media and control information. For example, nodes 102 and 106*a-c* may each be implemented as a computer. The nodes can communicate information to each other in the form of packets. A packet in this context may refer to a set of information of a limited length, with the length typically represented in terms of bits or bytes. A typical packet length, for example, might be 64 bytes. Node 102 may communicate the information to one or more nodes 106*a-c* by segmenting a set of media information and control information into a series of packets. Each packet may contain a portion of the media information plus some control information, with each packet having a sequence number. The control information may assist various intermediate nodes to route each packet from node 102 to its intended destination, such as one or more of nodes 106*a-c*. The destination node may receive the entire set of packets, place them in the correct order using the sequence numbers, and use them to reproduce the media information from node 102.

Switch 104 may comprise, for example, one of the intermediate nodes used to transport the packets through a network. Switch 104 may comprise a network switch or router operating in accordance with one or more media access control protocols, such as from the IEEE 802.3 series of Ethernet protocols. For example, switch 104 may be a high bandwidth switch, such as a Fast Ethernet switch operating at 100 megabits per second (Mbps), a Gigabit Ethernet switch operating at 1000 Mbps or 10 Gigabits per second (Gbps), and so forth. The embodiments are not limited in this context.

Switch 104 may switch packets between the various nodes of system 100. For example, switch 104 may switch packets from a source node to a destination node. Each packet may include a source address and destination address. Switch 104 may receive the packet, retrieve the destination address, and send the packet to an intermediate node or destination node based on the destination address.

In one embodiment, switch 104 may include one or more line cards 1-*m*. Line cards 1-*m* may be used to process data on a network line. Each line card acts as an interface between a network and a switch fabric. The line card may convert the data set from the format used by the network to a format for processing. The line card also may perform necessary processing on the data set. This processing may include further translation, encryption, error checking, and the like. After processing, the line card converts the data set into a transmission format for transmission across the switch fabric.

The line card also allows a data set to be transmitted from the switch fabric to the network. The line card receives a data set from the switch fabric, processes the data set, and then converts the data set into the network format. The network format can be, for example, ATM or a different format.

In one embodiment, line cards 1-*m* may comprise half-duplex processor based line cards. A half-duplex processor based line card may use multiple network processors to achieve full duplex network communications. For example, the half-duplex processor based line card may use a first network processor for inbound traffic and a second network processor for outbound traffic. Inbound data traffic is typically traffic from the media to the switch fabric, while outbound traffic is typically data traffic from the switch fabric to the media. Each network processor typically communicates with the switch fabric in only one direction.

A half-duplex processor based line card, however, may have difficulty in performing flow control. For example, when data buffers in either the line card and/or the switch fabric overflow, large round trip latency may be introduced to communicate flow control information to the line card and/or the switch fabric to adjust the data flow. Accordingly, switch 104 may use improved flow control techniques to reduce or eliminate this latency. Switch 104 may be described in more detail with reference to FIGS. 2-7.

Figure 2:
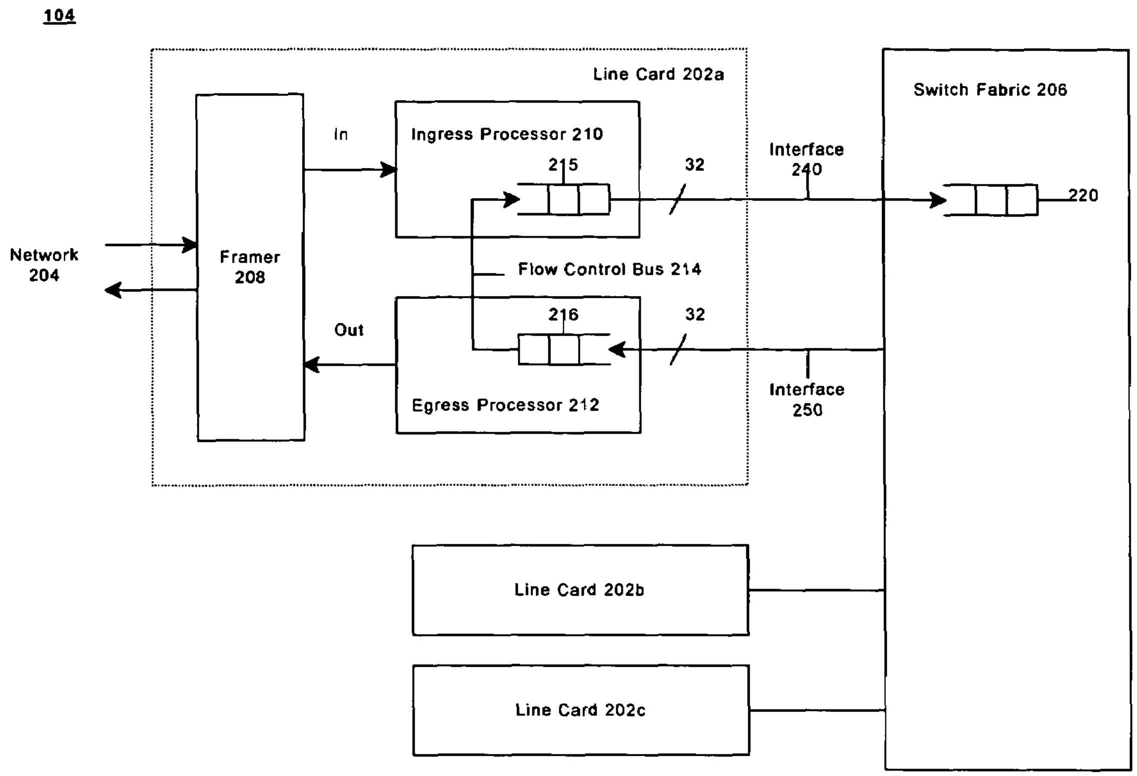
FIG. 2 illustrates a partial block diagram of a switch 104.

FIG. 2 illustrates a partial block diagram of switch 104. As shown in FIG. 2, switch 104 may comprise multiple elements, such as line cards 202*a-c* and a switch fabric 206. Some elements may be implemented using, for example, one or more circuits, components, registers, processors, software subroutines, or any combination thereof. Although FIG. 2 shows a limited number of elements, it can be appreciated that more or less elements may be used in switch 104 as desired for a given implementation. The embodiments are not limited in this context.

As shown in FIG. 2, switch 104 may include line cards 202*a-c*. Line card 202*a* illustrates a partial block diagram of a line card, which may be representative of an implementation for line cards 202*b* and 202*c* as well. Line card 202 uses two half-duplex network processors to provide full-duplex communications. One of the half-duplex processors may be used for outbound traffic and the other may be used for inbound traffic. Flow-control data may be received by an egress processor 212 from the switch fabric 206. The flow-control data may indicate the flow status of data queues in the switch fabric 206. The flow-control data may be transmitted to an ingress processor 210 via a private flow control bus 214. The flow control data may be used by the ingress processor 210 to temporarily suspend data transmits to one or more switch fabric data queues 220 of the switch fabric 206 determined to be congested. Once the congestion is cleared, data transmits to the switch fabric data queues 220 may resume.

Each line card may operate as an interface between a network 204 and the switch fabric 206. The network 204 may include, for example, all the elements of system 100 to include nodes 102 and 106*a-c*, and additional nodes as well. The line card 202*a* may receive a data set from the network 204 via a framer 208. The framer 208 converts the data set from the format used by the network 204, which may include segmenting the data set, to a format for processing. The converted data set is then transmitted to the ingress processor 210. The ingress processor 210 performs necessary processing on the data set before forwarding it to the switch fabric 206. This processing may include, for example, further translation, encryption, error checking, and so forth. After processing, the ingress processor 210 converts the data set into a transmission format for transmission across the switch fabric 206, then transmits the data set to the switch fabric 206. The transmission format may be common switch interface (CSIX) format or a different format. The CSIX protocol allows data to be transmitted from the source to the destination in variable sized units called C-Frames.

The line card 202 may also allow a data set to be transmitted from the switch fabric 206 to the network 204. The egress processor 212 receives a data set from the switch fabric 206, processes the data set, and then transmits the data set to the framer 208. The framer 208 converts the data set into the network format. The network format can be, for example, an ATM format or a different format.

In one embodiment, the ingress processor 210 may handle inbound traffic coming from the network 204, while egress processor 212 may handle outbound traffic going out to the network 204. The ingress processor 210 sends data to the switch fabric 206 via one way communications path 240. If the data buffer or queues 220 in switch fabric 206 becomes congested or overflows, the switch fabric 206 can send in-band or out-of-band flow control data to the egress processor 212 using the one way communications path 250. The egress processor 212 then sends this data to the ingress processor 210 using a communications path 214. The ingress processor 210 may analyze flow control bits in the flow control data. The flow control bits may be decoded to indicate which queues may be congested. Based on this analysis, the ingress processor 210 may temporarily suspend data transmission from one of its queues, such as transmission queue 215, to the congested queues.

In one embodiment, the egress processor 212 may divert the flow-control information to the ingress processor via the communications path 214. The communications path may be, for example, a four (4) bit data bus or other type of communications bus. The ingress processor 210 may receive the flow control information and process the information to temporarily suspend data transmissions to the data buffer 220 and/or to control the rate at which data is being sent to the data buffer 220. In embodiments of the present invention, a transmit scheduler may process the flow control data to maintain line rate performance.

In one embodiment, the communication path 240 may also be used to send flow control signaling from the ingress processor 210 to the switch fabric 206. The flow control signaling may identify queues in the data buffer 216 of the egress processor 212 that are congested. In response, the switch fabric 206 may adjust the transmission data rate and/or temporarily suspend data transmissions to the identified queues.

Ingress processor 210 and egress processor 212 may be implemented using any number of different processing systems. In one embodiment, for example, processors 210, 212 may each be implemented using a network processor. An example of a network processor appropriate for use as processors 210, 212 may be described in more detail with reference to FIG. 3.

Figure 3:
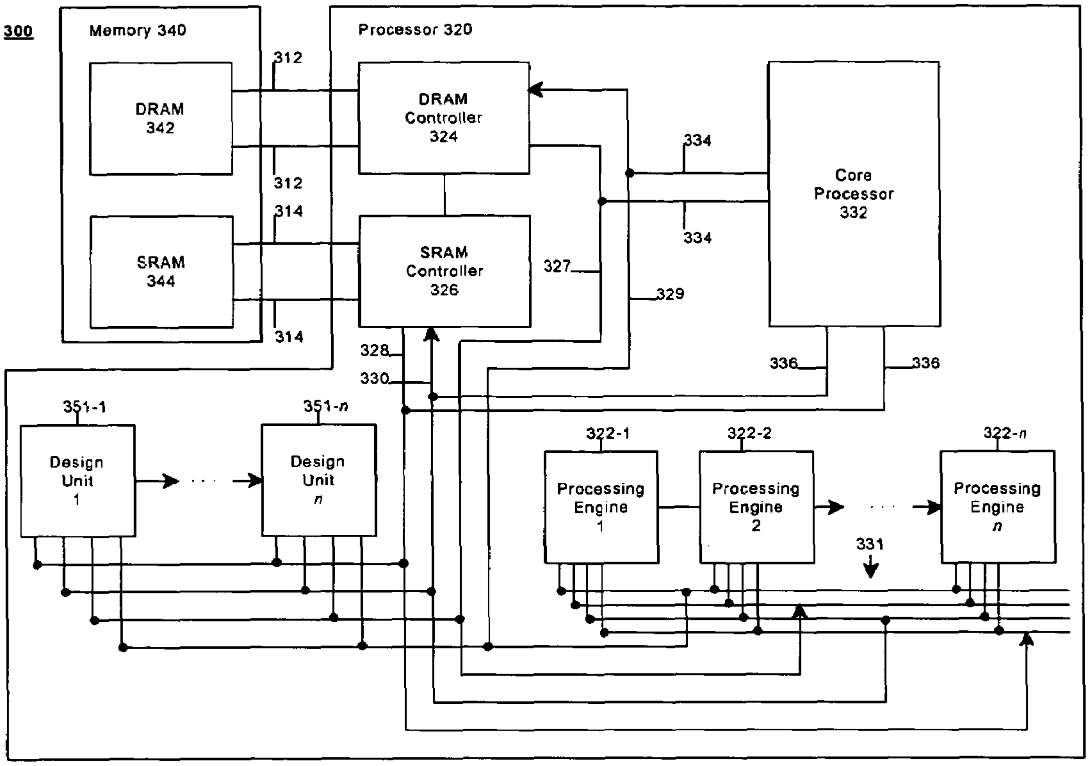
FIG. 3 illustrates a partial block diagram of a processing system 300.

FIG. 3 is a block diagram of a processing system 300. Processing system 300 may be representative of, for example, ingress processor 210 and/or egress processor 212. As shown in FIG. 3, processing system 300 may include a parallel, hardware-based multithreaded network processor 320 coupled by a pair of memory buses 312, 314 to a memory system or memory resource 340. Memory system 340 may include a dynamic random access memory (DRAM) unit 342 and a static random access memory (SRAM) unit 344. The processing system 300 may be especially useful for tasks that can be broken into parallel subtasks or functions. Specifically, hardware-based multithreaded processor 320 may be useful for tasks that are bandwidth oriented rather than latency oriented. Hardware-based multithreaded network processor 320 may have multiple micro-engines or processing engines 322-1-n, each with multiple hardware controlled threads that may be simultaneously active and independently work on a specific task.

Processing engines 322-1-n each may maintain program counters in hardware and states associated with the program counters. Effectively, corresponding sets of context or threads can be simultaneously active on each of processing engines 322-1-n while only one thread per processing engine may be actually operating at any one time. Processing engines 322 may be coupled to each other via next neighbor busses 331.

In one embodiment, network processor 320 may include eight processing engines 322-1-n, where n=8. Each processing engine 322-1-n may have capabilities for processing eight hardware threads or contexts. The eight processing engines 322-1-n may operate with shared resources including memory resource 340 and various bus interfaces. The hardware-based multithreaded processor 320 may include a DRAM controller 324 and a SRAM controller 326. DRAM unit 342 and DRAM controller 324 may be used for processing large volumes of data, for example, processing of network payloads from network packets. SRAM unit 344 and SRAM controller 326 may be used in a networking implementation for low latency, fast access tasks, for example, accessing look-up tables, core processor memory, and so forth.

In one embodiment, push buses 327, 328 and pull buses 329, 330 may be used to transfer data between processing engines 322-1-n and DRAM unit 342 and SRAM unit 344. In particular, push buses 327, 328 may be unidirectional buses that move the data from memory resource 340 to processing engines 322-1-n whereas pull buses 329, 330 may move data from processing engines 322-1-n to their associated DRAM unit 342 and SRAM unit 344 in the memory resource 340.

In one embodiment, eight processing engines 322-1-n may access either DRAM unit 342 or SRAM unit 344 based on characteristics of the data. Thus, low latency, low bandwidth data may be stored in and fetched from SRAM unit 344, whereas higher bandwidth data for which latency is less important, may be stored in and fetched from DRAM unit 342. Processing engines 322-1-n may execute memory reference instructions to either DRAM controller 324 or SRAM controller 326.

In one embodiment, the network processor 320 may also include a core processor 332 for loading microcode control for other resources of the network processor 320. Core processor 332 may be coupled by a DRAM push and pull bus 334 to DRAM controller 324. Core processor 332 may be coupled by a SRAM push and pull bus 336 to SRAM controller 326.

The core processor 332 may perform general purpose computer type functions such as handling protocols, exceptions, and extra support for packet processing where processing engines 322-1-n may pass the packets off for more detailed processing such as in boundary conditions. Core processor 332 may have an operating system (OS). Through the OS, core processor 332 may call functions to operate on processing engines 322-1-n. Core processor 332 may use any supported OS, such as a real time OS. In one embodiment, for example, core processor 332 may be implemented as an XScale® based architecture by Intel® Corporation of Santa Clara, Calif. Core processor 332 may also be implemented using, for example, an OS such as VXWorks from Wind River International of Alameda, Calif., μC/OS from Micrium, Inc. of Weston, Fla., and so forth. The embodiments are not limited in this context.

In one embodiment, the network processor 320 may interface to network devices such as a MAC device, such as a 10/100BaseT Octal MAC or a Gigabit Ethernet device. In general, the network processor 320 may interface to any type of communication device or interface that receives or sends a large amount of data. Similarly, processing system 300 may operate in a networking application to receive network packets and process those packets in a parallel manner.

Figure 4:
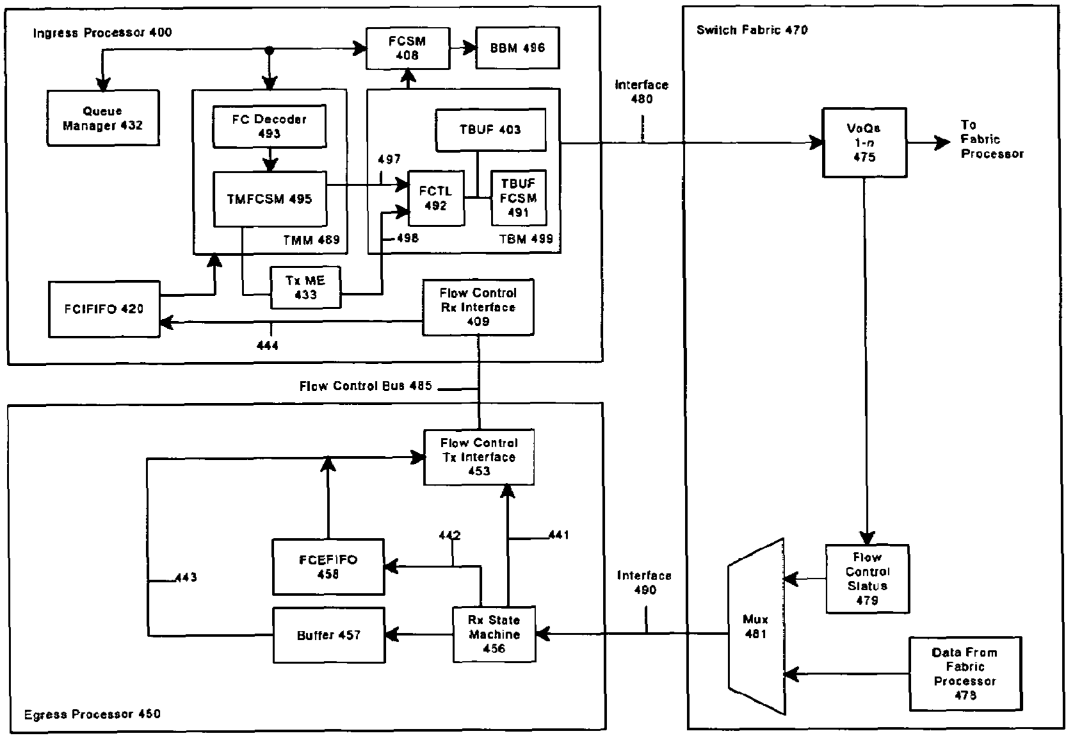
FIG. 4 illustrates flow control for a switch 104.

FIG. 4 may illustrate a more detailed block diagram of flow control handling in a switch, such as switch 104. Switch 104 may include a line card implemented using a network processor, such as processing system 300 as described with reference to FIG. 3. As shown in FIG. 4, ingress processor 400 and egress processor 450 may be coupled to a switch fabric 470 via unidirectional communication paths or interfaces 480 and 490, respectively.

In one embodiment, for example, communication paths 480 and 490 may use CSIX or other protocol for communications. A unit of information transferred via a CSIX interface is commonly referred to as a C-Frame. Examples of common C-Frame categories may include data, control and idle. Data flow control is provided through the control category. Idle C-Frames received from the switch fabric 470 are automatically discarded and automatically transmitted to the switch fabric 470 when there is no data and/or control information to transfer. Data and control C-Frames may be stored in buffers during transmit and receive operations. The buffers may be partitioned according to C-Frame category so the control and/or data C-Frames can be queued out separately.

In one embodiment, flow control data for a virtual output queue (VoQ) may be carried in flow control C-Frames. Flow control C-Frames may be placed in internal flow control buffers before they are passed to processing engines 322 in ingress processor 400 for processing. VoQ flow control may be provided by VoQ control bits that may indicate the status of a particular queue in the receiver. For example, an XON/XOFF bit to indicate whether the transmitter can send data to a particular VoQ in the receiver. It is recognized that VoQs may be located at one of the processors 400, 450, and/or switch fabric 470. In one example, if a VoQ status bit is set (e.g., XON/XOFF bit=1) in the VoQ flow control data received from the switch fabric 470, the ingress processor 400 may temporarily suspend data transfer to the particular VoQ at the switch fabric 470 over interface 480. Data transfer by ingress processor 400 to the VoQ may continue once the VoQ flow control bit is cleared (e.g., XON/XOFF bit=0).

More particularly, a XOFF bit may indicate that the associated VoQ of VoQs 1-n 475 and/or buffer 457 is congested and is unable to handle additional data at the current rate. In response, the ingress processor 400 may either discontinue transmitting for that VoQ and/or may adjust the rate at which data is being transmitted to the identified VoQ 475. Conversely, a XON bit may indicate that the associated VoQ of VoQs 1-n 475 and/or buffer 457 can receive data at the current rate from the ingress processor 400.

In one embodiment, egress processor 450 may include a receive (Rx) state machine 456 coupled to the switch fabric 470 via the interface 490. The interface 490 may be coupled to buffer 457 in the egress processor 450. Buffer 457 may include a plurality of VoQs to receive data from switch fabric 470. Rx state machine 456 may divert flow control data received from the switch fabric 470 to flow control egress first in first out (FCEFIFO) buffer 458 and/or directly to flow control transmit (Tx) interface 453.

In one embodiment, VoQ flow control data may be diverted to the FCEFIFO 458 via, for example, paths 442 and/or 443. The FCEFIFO 458 may store the VoQ flow control before sending it to the flow control transmit interface 453. Flow control transmit interface 453 may send flow control data to the ingress processor 400 over flow control bus 485. Alternatively, VoQ flow control data may be sent directly by the switch fabric 470 to the flow control receive interface 409 of the ingress processor 400.

In one embodiment, the ingress processor 400 may include flow control receive interface 409 coupled to the flow control bus 485. The flow control receive interface 409 may receive flow control data from egress processor 450 via the flow control bus 485. The flow control receive interface 409 may send the VoQ flow control data to a flow control ingress first in first out (FCIFIFO) buffer 420 via path 444 for storage. Based on the VoQ flow control data from the FCIFIFO 420, a transmit scheduler may control transmission of data stored in a transmission buffer (TBUF) 403. It is recognized that the queue manager 432 may service queues for data transfer, by removing a segment from it and sending it to the transmit element. The TBUF 403 may include one or more transmit buffers to hold the transmitting data temporarily before it can be sent to the switch fabric 470.

In general operation, switch fabric 470 may send switch fabric flow control status data 479 and payload data 478 to the egress processor 450 via interface 490. Flow control status 479 and data 478 may be multiplexed into a single C-Frame using multiplexer 481 and transmitted over the interface 490. Thus, flow control data 479 is sent using in-band signaling over the unidirectional interface 490. Alternatively, flow control data 479 may be sent using out-of-band signaling over the unidirectional interface 490 or a different interface.

The flow control data may include VoQ flow control data. VoQ flow control data may indicate whether one or more of the VoQ 1-n in buffer 475 and/or buffer 457 is unable to currently accommodate the data being received from the ingress processor 400 over interface 480. In other words, the flow control data may indicate whether the data from the ingress processors 400 is causing one or more of the VoQs 475-1 to 475-n to become congested. In this case, an overflow message indicating that a VoQ buffer threshold has been exceeded may be included in the flow control status data 479. In one embodiment, for example, the flow control data 479 may include a XON/XOFF bit for each of the VoQs 475-1 to 475-n and/or VoQs in buffer 457.

One problem associated with flow control is that there may be a significant amount of delay between when a flow control request is issued from switch fabric 470 to when the ingress processor 400 services the flow control request and stops transmission of segments to the selected VOQ. Packets/segments that have been scheduled by the transmit scheduler but have not yet been transmitted out of the Ingress Processor are called "in-flight" packets/segments. As a result of the flow control message, the congestion of the given VoQ may be exacerbated by the packets-in-flight in ingress processor 400. In some cases, for example, there may be 32-64 packets in flight at any given moment in time for the scheduled VOQ. Therefore if the transmission of these packets in not stopped when the flow control message is received, it may take a time interval of approximately 32-64 packet times to service a flow control request, such as temporarily preventing a VoQ from transmitting data. This latency or "skid time" may cause connected components, such as a fabric interface chip (FIC), to need a relatively large amount of buffer space to accommodate the additional transmitted packets. This may potentially increase costs and complexity of switch 104, while decreasing overall performance.

Some embodiments may be arranged to solve these and other flow control problems. For example, ingress processor 400 may be modified to include a traffic management module (TMM) 489 and TBUF module (TBM) 499. TMM 489 and TBM 499 may assist in reducing the time interval to service a flow control request. Reducing the time interval to service a flow control request may result in improved flow control management, as well as improved overall system performance of switch 104. It may be appreciated that TMM 489 and TBM 499 may be implemented in hardware, software, or a combination of both, as desired for a given set of design constraints.

In one embodiment, the TMM 489 may include a flow control (FC) decoder 493. Although the FC decoder 493 is shown as part of TMM 489, it may be appreciated that the FC decoder 493 may be implemented as a separate thread executed by a processing engine 322-1-n external to TMM 489. The embodiments are not limited in this context.

The FC decoder 493 may receive flow control data from FCIFIFO 420. The FC decoder 493 may decode the incoming flow control data to retrieve a VoQ status bit indicating a XON condition or XOFF condition for a queue. The TMM 489 may generate a XOFF message or XON message in accordance with the VoQ status bit, with each message to include the VoQ status bit and the corresponding queue number. The XOFF message may indicate that flow control is turned on for a queue, while the XON message may indicate that flow control is removed for a queue. The TMM 489 may send the XOFF message and/or XON message to TBM 499 via a dedicated control path 497. Dedicated control path 497 allows flow control XOFF messages to reach TBM 499 faster than the normal transmit path used to process packets through ingress processor 400. The transmit path, as represented by Tx ME 433 of transmit path 498, for example, processes the transmit packets in order. In this manner, FCTL 492 may turn off a VoQ in TBUF 403 faster than if using the transmit path 498.

When a VoQ in TBUF 403 is turned off, however, there may be a number of packets left in the transmit pipeline for the flow controlled queue. These packets need to be handled by the flow control technique. Accordingly, TMM 489 may generate and send a FENCE message to TBM 499 via the transmit path 498. A FENCE message may comprise a control word sent by the TMM 489 along the usual transmit path to make sure that all the packets in the transmit path have been sent to the TBUF 403 before the FENCE control word is received. The control word may include, for example, a queue number and FENCE identifier (ID). The control word may also be sent along with the new scheduled packet identifier to the TBUF 403 in the normal transmit path 403.

In one embodiment, the TMM 489 may include a transmit management flow control state machine (TMFCSM) 495. The TMFCSM 495 may comprise, for example, a 4-state state machine per queue that transitions between the various states in response to messages received by TMM 489. For example, TMFCSM 495 may change states in response to an XON or XOFF message received from the switch fabric 470. In another example, TMFCSM 495 may change states in response to a ROLL BACK COMPLETE message that is received from a flow control service module (FCSM) 408, or a FENCE RECEIVED message that is received from TBM 499. The term "roll back" may refer to an operation where "in-flight" packets/cells are put back into a given output queue without any transmit order change by resetting the data pointers in the queue.

An example of the various states for TMFCSM 495 may be given in TABLE 1.

TABLE 1

| Current State | Condition | Next State | Operation |
|---|---|---|---|
| Normal | XOFF | XOFF, No XON | Issue FENCE. |
| XOFF, No XON | XOFF | XOFF, No XON | Loop to same state. |
| | ROLL BACK/ FENCE | Ready, No XON | Next state. |
| | XON | XOFF, XON | Wait for ROLL BACK COMPLETE message. |
| Ready, No XON | | XOFF, No XON | Waiting for XON and a new XOFF arrives. No new FENCE is issued since no new packets have been issued after first XOFF. |

The operation of TMFCSM 495 and the examples provided in TABLE 1 may be described in more detail with reference to FIG. 5.

Figure 5:
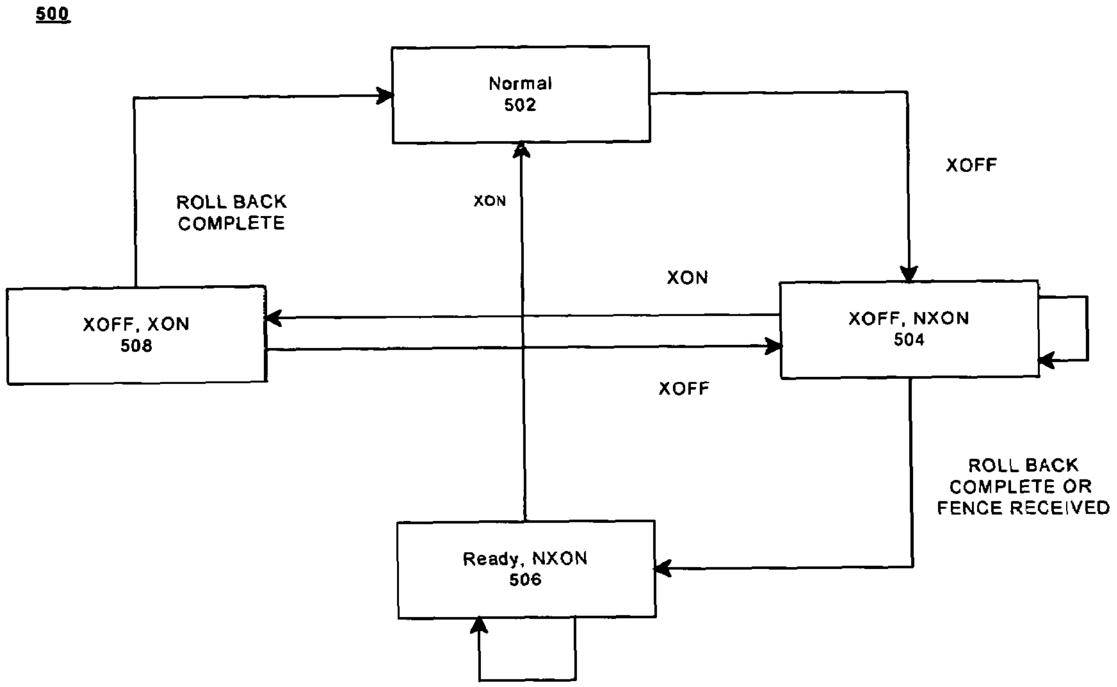
FIG. 5 illustrates a state machine 500.

FIG. 5 may illustrate a state machine 500. State machine 500 may be representative of a state machine appropriate for TMFCSM 495 using the examples provided in TABLE 1. As shown in FIG. 5, the state machine 500 may include a Normal State 502, a XOFF/No XON (NXON) State 504, a Ready/NXON State 506, and a XOFF/XON State 508. The Normal State 502 may indicate a normal operating mode.

If the FC decoder 493 of TMM 489 receives flow control data indicating a transmit queue in TBUF 403 needs flow control, TMM 489 may generate and send a XOFF message to TBM 499 via the dedicated control path 497. TMM 489 may also generate and send a FENCE message to TBM 499 via the transmit path 498. FC decoder 493 may cause state machine 500 to change state from the Normal State 502 to the XOFF/NXON State 504.

State machine 500 may change states in response to a XON message, a ROLL BACK COMPLETE message, or a FENCE RECEIVED message. While a XOFF signal is received, state machine 500 may remain in the XOFF/NXON State 504. If a XON message is received from switch fabric 470, FC decoder 493 may generate and send a XON message to TBM 499. FC decoder 493 may also cause state machine 500 to change state from the XOFF/NXON State 504 to the XOFF/XON State 508. If FC decoder 493 receives a ROLL BACK COMPLETE message or a FENCE RECEIVED message, FC decoder 493 may cause state machine to change state from the XOFF/NXON State 504 to the Ready/NXON State 506.

In the Ready/NXON State 506, state machine 500 may be waiting for a XON message. If state machine 500 receives a new XOFF message instead of the XON message, however, state machine 500 may not necessarily issue a new FENCE message since it has not issued any new packet after the first XOFF message. If a XON message is received from switch fabric 470, FC decoder 493 may generate and send a XON message to TBM 499. FC decoder 493 may also cause state machine 500 to change from the Ready/NXON State 506 to the Normal State 502.

In the XOFF/XON State 508, state machine may be waiting for a ROLL BACK COMPLETE message. State machine 500 may change from the XOFF/XON State 508 to the Normal State 502 if a ROLL BACK COMPLETE message is received.

Referring again to FIG. 4, the TBM 499 may include a flow control table lookup (FLTL) 492. The FLTL 492 may be arranged to turn off a given queue in TBUF 403 when a XOFF message is received. When a queue goes in XOFF state, no further segments are sent from this queue. The FLTL 492 may also be arranged to turn on a given queue in TBUF 403 when an XON message is received and previous ROLL BACK is complete. When a queue goes in an XON state, the transmission of segments from this queue may be resumed.

In addition to handling flow control, the FLTL 492 may instruct a buffer and block manager (BBM) 496 to release or free up various buffers and blocks. The BBM 496 may receive a RELEASE message from the TBM 499 to return buffers and/or blocks to a free pool after all data has been transmitted from that buffer/block. A buffer may be released when the last segment of the buffer is transmitted. Similarly, a block may be released when the last buffer in the block has been transmitted.

In one embodiment, the TBM 499 may include a TBUF flow control state machine (TBUFFCSM) 491. The TBUFFCSM 491 may comprise, for example, a 4-state state machine per queue that may be arranged to change between various states as XOFF and FENCE messages are received from the TMM 489. An example of the various states for TBUFFCSM 491 may be given in TABLE 2.

TABLE 2

| Current State | Next State | Operation |
|---|---|---|
| Normal (00) | First XOFF XOFF | A first XOFF message received. No ROLL BACK message or FENCE message yet received. |
| First XOFF (10 | Wait For Fence (01) | A ROLL BACK message received. Waiting for a FENCE message. Normal operations may resume after FENCE message is received. |
| | Normal (00) | A ROLL BACK message is not needed since a FENCE message has been received. |
| Wait For Fence (01) | Normal (00) | A FENCE message has been received. Normal operations may resume. |
| | Second XOFF (11) | A second XOFF message is received. No FENCE message has been received for the first XOFF message. Wait for the FENCE message for the first XOFF message, and a ROLL BACK or FENCE message for the second XOFF message. |
| Second XOFF (11) | First XOFF (10) | The FENCE message for the first XOFF message has been received. Waiting for a ROLL BACK or FENCE message for the second XOFF message. |

The operation of TBUFFCSM 491 and the examples provided in TABLE 2 may be described in more detail with reference to FIG. 6.

Figure 6:
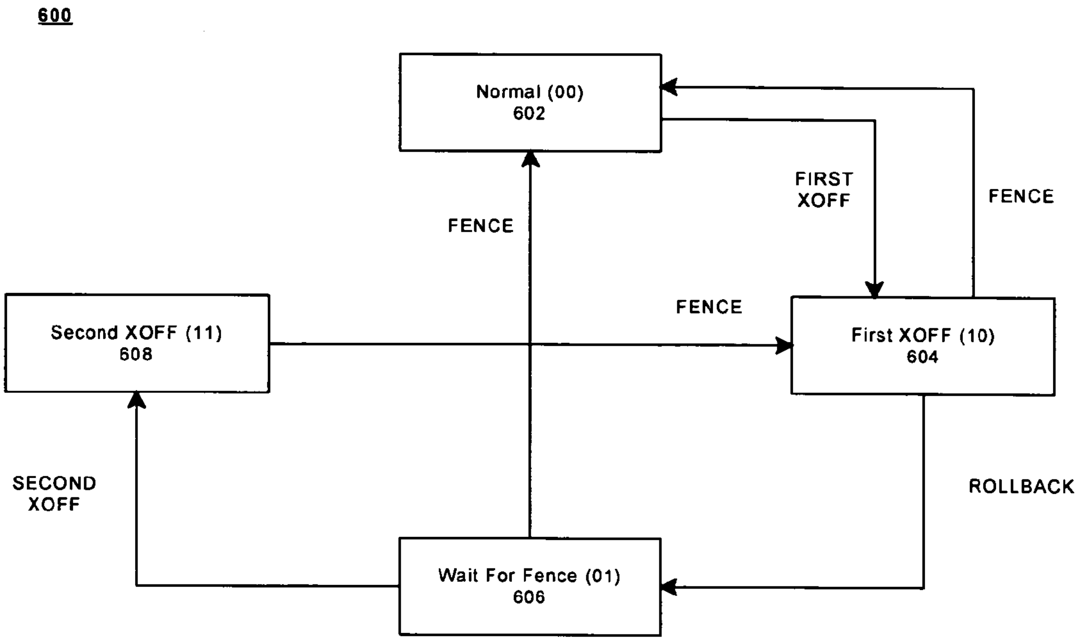
FIG. 6 illustrates a state machine 600.

FIG. 6 may illustrate a state machine 600. State machine 600 may be representative of a state machine appropriate for TBUFFCSM 491 using the examples provided in TABLE 2. As shown in FIG. 6, the state machine 600 may include a Normal State (00) 602, a FIRST XOFF (10) State 604, a Wait For Fence (01) State 606, and a Second XOFF (11) State 608. The Normal State 602 may indicate a normal operating mode. If FCTL 492 of TBM 499 receives a XOFF message from TMM 489, FCTL 492 may turn off the queue identified in the XOFF message. FCTL 492 may also cause state machine 600 to change state from the Normal State 602 to the First XOFF State 604.

In the First XOFF State 604, state machine 600 may be waiting for a FENCE message or a packet. If a FENCE message is received before a packet, FCTL 492 may cause state machine 600 to change state from the First XOFF State 604 to the Normal State 602. The receipt of a FENCE message before a packet may indicate that there are no roll back operations needed since there was no packet in flight at the time the flow control request was serviced. Receipt of a FENCE in this state also causes state machine to return to NORMAL State 602. If a packet is received before a FENCE message, FCTL 492 may issue a ROLL BACK request to FCSM 408. FCTL 492 may also cause state machine 600 to change state from the First XOFF State 604 to the Wait For Fence State 606.

In the Wait For Fence State 606, state machine 600 may be waiting for a FENCE message or a second XOFF message from TMM 489. If a FENCE message is received, FCTL 492 may cause state machine 600 to change state from the Wait For Fence State 606 to the Normal State 602. If a second XOFF message is received, FCTL 492 may cause state machine 600 to change state from the Wait For Fence State 606 to the Second XOFF State 608.

In the Second XOFF State 608, state machine 600 may be waiting for a FENCE message for the second XOFF message. If a FENCE message for the second XOFF message is received, FCTL 492 may cause state machine 600 to change state from the Second XOFF State 608 back to the First XOFF State 604. State machine 600 may change states from the First XOFF State 604 to the Normal State 602 as previously described.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 7:
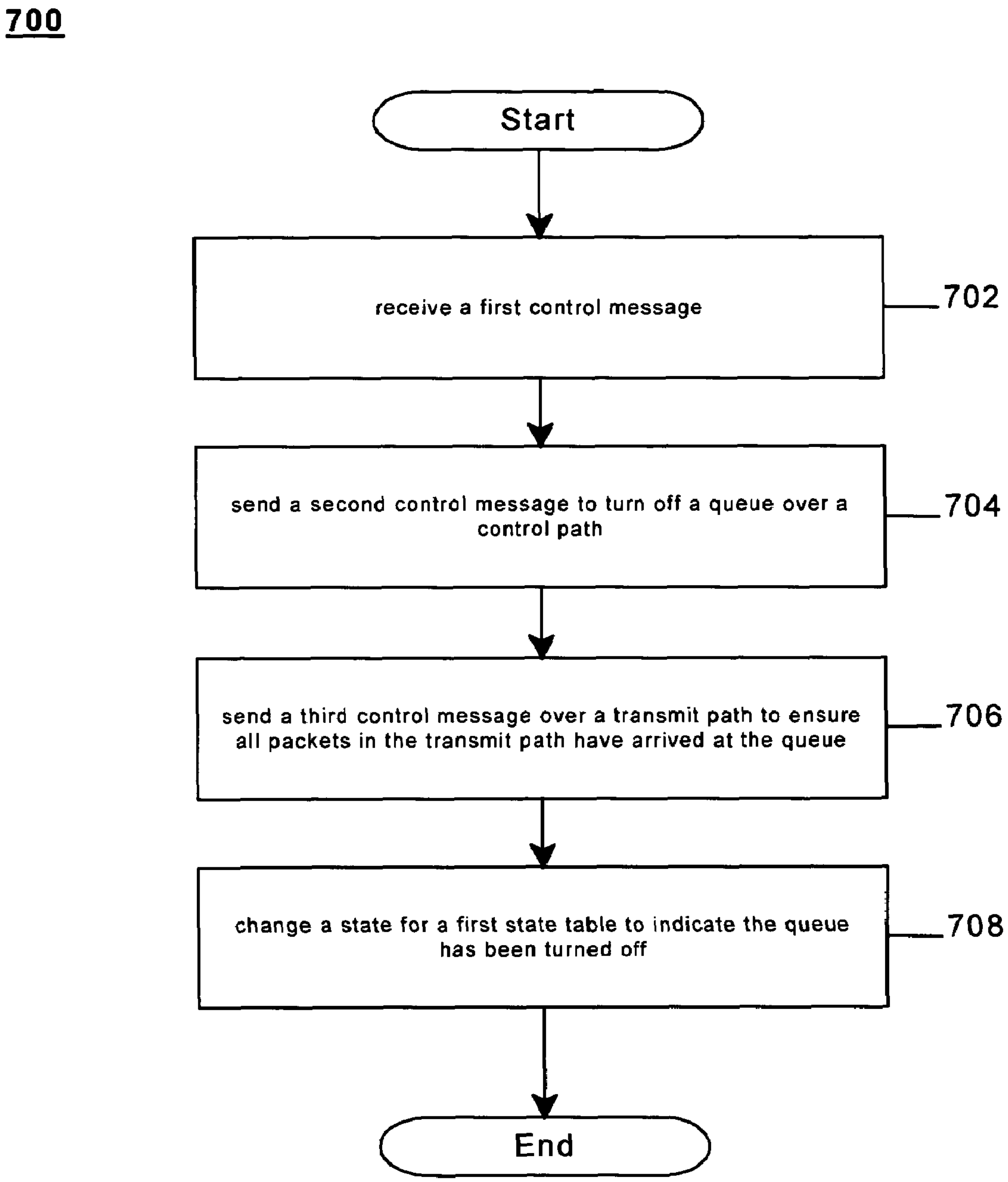
FIG. 7 illustrates a programming logic 700.

FIG. 7 illustrates a programming logic 700. Programming logic 700 may be representative of the operations executed by one or more systems described herein, such as switch 104, network processor 200, and/or ingress processor 300. As shown in programming logic 700, a first control message may be received at block 702. The first control message may comprise, for example, an incoming flow control message from a switch fabric. As a result, a second control message may be generated and sent to turn off a queue over a control path at block 704. This second control message may comprise, for example, a XOFF message. A third control message may be sent over a transmit path to ensure all packets in the transmit path have arrived at the queue at block 706. The third control message may comprise, for example, a FENCE message. A state for a first state table may be changed to indicate the queue has been turned off at block 708. The first state table may comprise, for example, the state table used by state machine 500.

In one embodiment, a fourth control message may be received to indicate a set of roll back operations have been completed. The fourth control message may comprise, for example, a ROLL BACK COMPLETE message. The state for the first state table may be changed to indicate that the roll back operations have been completed.

In one embodiment, a fifth control message may be received to turn on the queue. The fifth control message may comprise, for example, a XON message. The state for the first state table may be changed to indicate the queue has been turned on.

In one embodiment, the second control message may be received. The queue may be turned off in response to the second control message. A state for a second state table may be changed to indicate the queue has been turned off. The second state table may comprise, for example, the state table used by state machine 600.

In one embodiment, the third control message may be received before a packet from the transmit path. The state for the second state table may be changed to a normal operating state.

In one embodiment, a packet may be received before the third control message. A sixth control message may be sent to perform roll back operations. The sixth control message may comprise, for example, a ROLL BACK message. The state for the second state table may be changed to wait for the third control message.

It may be appreciated that the sequential terms "first", "second", "third", "fourth", "fifth" and "sixth" are used only to uniquely identify a given message. These terms do not necessarily represent that the messages are transmitted or received in a temporal or sequential order corresponding to the sequential terms. The embodiments are not limited in this context.

The operation of the above described systems and associated programming logic may be better understood by way of example. Assume the TMM 489 receives flow control data from flow control receive interface 409 and/or FCIFIFO 420. The FC decoder 493 may decode the flow control data. The FC decoder 492 may control flow control operations for TBM 499 in accordance with the decoded flow control data. For example, if the decoded flow control data includes a VoQ XON/XOFF status bit set to XOFF, the TMM 489 may send a XOFF message with the decoded XOFF information to TBM 499 using the dedicated control path 497. In another example, if the decoded flow control data includes a VoQ XON/XOFF status bit set to XON, the TMM 489 may send an XON message with the decoded XON information to TBM 499 using the dedicated control path 497. The FC decoder 493 may change TMFCSM 495 to the appropriate state after sending an XOFF message or an XON message in accordance with TABLE 1 and state machine 500.

The dedicated control path 497 may be used to communicate messages directly between TMM 489 and TBM 499. For example, the TMFCSM 495 may send the XOFF message and the XON message to TBUFFCSM 491 using, for example, 4 wires plus 1 valid bit. In order to indicate flow control on 16,000 queues, the queue identifier (QID) should comprise at least 14 bit. The 14-bit QID can be supplied on these 4 wires in 4 chassis cycles, for example. The use of the dedicated control path 497 may allow TBM 499 to implement flow control operations faster than using conventional techniques. In this manner, the overall latency between when the switch fabric 470 issues a flow control request and when TBUF 403 services the flow control request for a particular queue may be reduced.

TMM 489 may also send a FENCE message to TBM 499 using the transmit path 498. The TMFCSM 495 may issue a FENCE message as a flush request so that all the requests in the transmit pipeline for the flow controlled queue have been seen and rolled back. TBUFFCSM 491 may use the first received packet before the FENCE message to perform roll back operations. If no packet is received before the FENCE message, it may indicate that roll back operations are not needed since there was no packet in flight at the time the flow control was serviced for this queue.

The TMM 489 may also receive various flow control messages from other elements of the ingress processor 400. For example, the TMM 489 may receive a ROLL BACK COMPLETE message from the FCSM 408 or the queue manager 432 to indicate roll back operations have been completed. In another example, the TMM 489 may receive a FENCE RECEIVED message from the TBM 499 to indicate that the TBM 499 has successfully received a FENCE message. The FC decoder 493 may update the state of TMFCSM 495 accordingly.

TBM 499 may receive the various flow control messages from TMM 489 and implement flow control operations in response to the messages. For example, FCTL 492 of TBM 499 may receive the XOFF message from TMM 489. FCTL 492 may turn off the queue in TBUF 403 corresponding to the queue number in the XOFF message. FCTL 492 may also change the queue state of TBUFFCSM 491 in accordance with TABLE 2 and state machine 600. FCTL 492 may then wait to receive a packet or FENCE message for the queue.

If FCTL 492 receives a packet before a FENCE message, a roll back of queue parameters in queue manager 432 may be needed. To accomplish this, TBM 499 may send a ROLL BACK request to the FCSM 408. The ROLL BACK request may include one or more segment descriptors, such as a block address, an offset in the block, a buffer descriptor with remaining segment count, and so forth. The FCSM 408 may send this segment descriptor to queue manager 432. Queue manager 432 may write the buffer descriptor with remaining segment count at a location provided by, for example, the block address plus the offset in the block. Once the ROLL BACK request has been completed, the FCSM 408 may send a ROLL BACK COMPLETE message to the TMM 489. TMFCSM 495 of TMM 489 may receive the ROLL BACK COMPLETE message, and may change to the appropriate state based on this information.

If FCTL 492 receives a FENCE message without receiving a packet prior to the FENCE message, FCTL 492 may cause TBUFFCSM 491 to revert to a normal operating state. Receiving a FENCE message without receiving a packet prior to the FENCE message may indicate that there were no packets in flight at the time the flow control was serviced for a given queue, and therefore roll back operations are not needed.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:

a first processor to include a traffic manager module and a transmit buffer module, said traffic manager module to send flow control messages to said transmit buffer module over a control path and a transmit path, said flow control messages to include at least one of: a control message to turn off a queue, a control message to turn on said queue; or a message over said transmit path to ensure all packets in said transmit path have arrived at said queue, and said transmit buffer module to manage flow control for a queue in response to said flow control messages.

2. The apparatus of claim 1, wherein said traffic manager module includes a flow control decoder and a transmit management flow control state machine.

3. The apparatus of claim 1, wherein said transmit buffer module includes a flow control table lookup and a transmit buffer flow control state machine.

4. The apparatus of claim 1, including a flow control service module to connect to said transmit buffer module, said transmit buffer module to send a request to perform roll back operations to said flow control service module.

5. The apparatus of claim 4, including a queue manager to connect to said flow control service module, said flow control service module to send said request to perform roll back operations to said queue manager, said request to include a segment descriptor, and said queue manager to write a remaining segment count using said segment descriptor.

6. The apparatus of claim 1, including a buffer and block manager to connect to said transmit buffer module, said buffer and block manager to receive a release message from said transmit buffer module, said buffer and block manager to release a buffer when said buffer is empty, and to release a block when a last buffer has been released.

7. The apparatus of claim 1, including:

a flow control bus to connect to said first processor;

a second processor to connect to said flow control bus; and wherein said first processor is arranged to process packets from a network to a switch fabric, and said second processor is arranged to process packets from said switch fabric to said network.

8. The apparatus of claim 1, wherein said first processor comprises an ingress processor, said second processor comprises an egress processor, and at least one of said first and second processors is implemented using a network processor.

9. A system, comprising:

a switch fabric;

a first processor to connect to said switch fabric by a first bus;

a second processor to connect to said switch fabric by a second bus;

a flow control bus to connect said first processor and said second processor; and wherein said first processor is to include a traffic manager module and a transmit buffer module, said traffic manager module to send flow control messages to said transmit buffer module over a control path and a transmit path, said flow control messages to include at least one of: a control message to turn off a queue, a control message to turn on said queue; or a message over said transmit path to ensure all packets in said transmit path have arrived at said queue, and said transmit buffer module to manage flow control for a queue in response to said flow control messages.

10. The system of claim 9, further comprising a communications medium to connect a network to said first processor and said second processor.

11. The system of claim 9, wherein said traffic manager module includes a flow control decoder and a transmit management flow control state machine.

12. The system of claim 9, wherein said transmit buffer module includes a flow control table lookup and a transmit buffer flow control state machine.

13. The system of claim 9, including a flow control service module to connect to said transmit buffer module, said transmit buffer module to send a request to perform roll back operations to said flow control service module.

14. The system of claim 13, including a queue manager to connect to said flow control service module, said flow control service module to send said request to perform roll back operations to said queue manager, said request to include a segment descriptor, and said queue manager to write a remaining segment count using said segment descriptor.

15. The system of claim 9, including a buffer and block manager to connect to said transmit buffer module, said buffer and block manager to receive a release message from said transmit buffer module, said buffer and block manager to release a buffer when said buffer is empty, and to release a block when a last buffer has been released.

16. The system of claim 9, wherein said first processor comprises an ingress processor, said second processor comprises an egress processor, and at least one of said first and second processors is implemented using a network processor.

17. A method, comprising:

receiving a first control message;

sending a second control message to turn off a queue over a control path;

sending a third control message over a transmit path to ensure all packets in said transmit path have arrived at said queue; and changing a state for a first state table to indicate said queue has been turned off.

18. The method of claim 17, including:

receiving a fourth control message to indicate a set of roll back operations have been completed; and changing said state for said first state table to indicate said roll back operations have been completed.

19. The method of claim 17, including:

receiving a fifth control message to turn on said queue; and changing said state for said first state table to indicate said queue has been turned on.

20. The method of claim 17, including:

receiving said second control message;

turning off said queue; and changing a state for a second state table to indicate said queue has been turned off.

21. The method of claim 17, including:

receiving said third control message before a packet; and changing a state for a second state table to a normal operating state.

22. The method of claim 17, including:

receiving a packet before said third control message;

sending a sixth control message to perform roll back operations; and changing a state for a second state table to wait for said third control message.

23. A computer-readable medium storing instructions that when executed by a processor are operable to receive a first control message, send a second control message to turn off a queue over a control path, send a third control message over a transmit path to ensure all packets in said transmit path have arrived at said queue, and change a state for a first state table to indicate said queue has been turned off.

24. The computer-readable medium claim 23 further storing instructions that when executed by a processor are operable to receive a fourth control message to indicate a set of roll back operations have been completed, and change said state for said first state table to indicate said roll back operations have been completed.

25. The computer-readable medium of claim 23 further storing instructions that when executed by a processor are operable to receive a fifth control message to turn on said queue, and change said state for said first state table to indicate said queue has been turned on.

26. The computer-readable medium of claim 23 further storing instructions that when executed by a processor are operable to receive said second control message, turn off said queue, and change a state for a second state table to indicate said queue has been turned off.

27. The computer-readable medium of claim 23 further storing instructions that when executed by a processor are operable to receive said third control message before a packet, and change a state for a second state table to a normal operating state.

28. The computer-readable medium of claim 23 further storing instructions that when executed by a processor are operable to receive a packet before said third control message, send a sixth control message to perform roll back operations, and change a state for a second state table to wait for said third control message.

* * * * *

UNITED STATES PATENT AND TRADEMARK OFFICE

CERTIFICATE OF CORRECTION

PATENT NO. : 7,554,908 B2
APPLICATION NO. : 11/009861
DATED : June 30, 2009
INVENTOR(S) : Sanjeev Jain et al.

It is certified that error appears in the above-identified patent and that said Letters Patent is hereby corrected as shown below:

In the drawings:

In Sheet 4 of 7, FIGURE 4, Box 479, line 3, delete “Slatus” and insert -- Status --, therefor.

In column 18, line 14, in Claim 24, after “medium” insert -- of --.

Signed and Sealed this

Sixteenth Day of March, 2010

David J. Kappos
*Director of the United States Patent and Trademark Office*